A. C. DESLER.
MEANS FOR CONNECTING AUTOMOBILE BODIES TO THE CHASSIS.
APPLICATION FILED APR. 12, 1921.

1,422,086.  Patented July 11, 1922.

Inventor
Arthur C. Desler

By Jas. L. Skidmore
His Attorney.

UNITED STATES PATENT OFFICE.

ARTHUR C. DESLER, OF RADFORD, VIRGINIA.

MEANS FOR CONNECTING AUTOMOBILE BODIES TO THE CHASSIS.

1,422,086.  Specification of Letters Patent.  Patented July 11, 1922.

Application filed April 12, 1921. Serial No. 460,647.

*To all whom it may concern:*

Be it known that I, ARTHUR C. DESLER, citizen of the United States, residing at Radford, in the county of Montgomery and State of Virginia, have invented certain new and useful Improvements in Means for Connecting Automobile Bodies to the Chassis, of which the following is a specification.

This invention relates to certain new and novel means for connecting an automobile body to the chassis.

The prime object of my invention is to provide simple, durable, economical and efficient means for so connecting the body of an automobile to its chassis that the weight of said body will be equally divided on the springs at all times, and at the same time reducing the shock to a minimum when travelling over rough and uneven roads.

Another object of this invention is to so construct and connect my novel means that the tendency to twist the body and chassis on uneven roads is materially and effectively lessened.

Further objects of the invention are to materially increase the longevity of the automobile, and to provide a more elastic medium for the body while driving over rough roads at considerable speed.

The foregoing and such other objects as may appear from the ensuing description are accomplished by the construction, arrangement, location and combination of the parts hereinafter more fully described, illustrated by the accompanying drawings, and particularly pointed out in the claims appended hereto, it being understood that slight changes in the precise construction, proportions and minor details may be resorted to without departing from the spirit or sacrificing any of the advantages of the invention.

In the accompanying drawings forming a part of this specification it will be seen that:—

Figure 1:
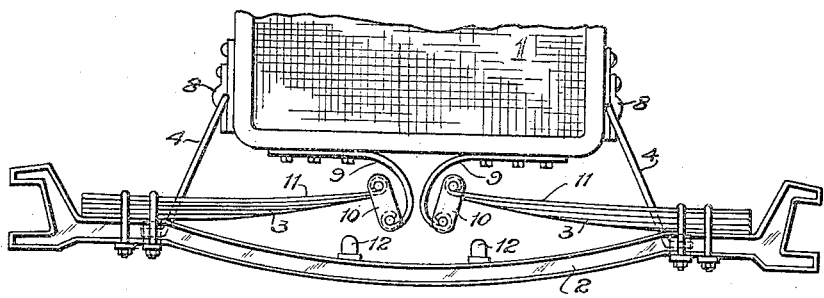
Figure 3:
Figure 2:
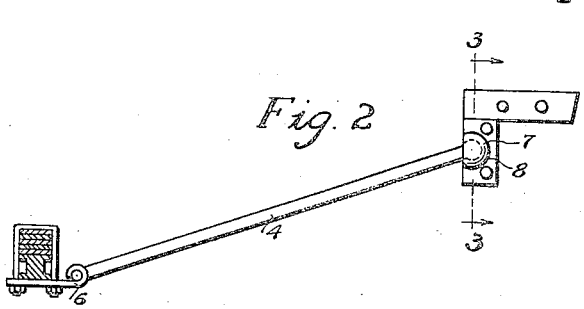

Figure 1 is a front elevation of the means embodying my invention, showing the front portion of the body broken away, Fig. 2 is a detail showing the tension rod and its connections to the chassis and frame of the automobile, and Fig. 3 is a detail section taken on the dotted lines, 3—3, Fig. 2.

Similar numerals of reference are employed to designate like parts in the several figures of the drawings.

In carrying out my invention as illustrated, the numeral 1 indicates the body portion, 2 the front axle of the chassis, 3 a one quarter portion of an elliptic spring suitably and securely fastened near each end of the said axle, 4 the radius rods, one end of each of said rods being secured to a spring clip 6 firmly secured near each end of the axle 2, and its other end being provided with an integrally connected ball 7 adapted to be seated within a ball receiving socket 8 secured to and carried by the frame of the body portion.

To the lower front face portion of the body is securely fastened in any suitable or desirable manner, one end portion of two plate spring hanger members 9, while the other end portion of each of said members is curved downwardly and outwardly with the lower terminal of each of the members firmly secured to the lower end of clip 10, the other end portion of each clip 10 being securely fastened to the inner end of the top leaf or plate 11 of each of one quarter portion of an elliptic spring, and secured intermediate of the axle 2 near its central portion are a plurality of rubber bumpers 12.

It will be perceived by reference to Fig. 2 of the drawings that each radius rod 4 is bent at one end to engage with the opening formed in the outer end portion of the spring clip 6 and is securely held in place by said clip secured to the bottom face of the axle, while the upper end of each rod is connected to the frame of the car by any suitable ball and socket formation, thus allowing a free up and down movement to the body in driving over rough and uneven roads, and the hanger members 9 will retain the car body in substantially perfect alinement when turning corners and steering.

It will be readily obvious that with this construction and arrangement of the parts, when one of the front wheels of the car passes over an obstruction or raised portion of the road which tends to lift or lower it abruptly the body is not tipped with such suddenness as is the case with the ordinary cars now in use.

It has been thoroughly demonstrated that my novel means of connecting the body of a car to its chassis furnishes greatly increased elasticity to the body and constitutes an efficient shock absorber therefor, and at the same time allows universal movement of the axle without the slightest tendency to twist or strain the body member; allows the weight to be equally divided on both springs at all times; materially prolongs the longevity of the car and economizes in the use of tires.

It will be readily evident that when my novel means is applied to a car like the Maxwell; Overland; Dodge, and other like types, one end of the radius rods would be fitted to the end of the frame in place of the front spring now commonly employed.

It will be understood that substantially the same means is employed to connect the rear portion of the body to the rear portion of the chassis, hence further illustration and description of my novel connecting means is believed to be entirely unnecessary.

Having thus described my invention what I claim and desire to secure by Letters Patent is:—

1. Means for connecting an automobile body to its chassis, comprising a plurality of plate spring hanger members, the outer end of each member being secured to the lower face of the body and each inner end extending downwardly, a plurality of one-quarter elliptic springs secured to the axle, and means for connecting the inner end of the top plate of each spring and the inner lower end of each hanger spring member together.

2. Means of the character described comprising a plurality of hanger spring members, each member being fixedly secured at its outer end to the lower face of the body and its inner end curved downwardly and outwardly, a plurality of springs fixedly secured to the axle, and means for fixedly connecting together the inner end of the top plate of each spring and the inner lower end of each hanger spring member.

3. Means of the character described comprising a plurality of plate spring hanger members fixedly secured to the lower face of the body, the inner end of each member extending downwardly at the central portion of said body, a plurality of springs fixedly secured to the axle, each of said springs having a top plate terminating near the center of said body, and a clip for securing the inner end of each top plate to the inner lower end of each hanger spring member.

4. Means for connecting an automobile body to its chassis comprising a plurality of hanger spring members, each member having an inner downwardly extended curved portion at the center of said body, a plurality of one quarter elliptic springs secured to the axle, each spring having a top plate terminating near the center of said body, and means for resiliently securing the inner end of each top plate to the inner lower end of each hanger spring member.

5. Means of the character described comprising a plurality of spring members fixedly secured to the lower face of the body, a plurality of spring members secured to the axle with their inner ends terminating near the center of said body, means for connecting the inner end of each of said spring members together, and radius rods having one end of each rod secured to the axle and the other end secured to the frame.

6. Means of the character described comprising a plurality of spring members each being fixedly secured at its outer end to the lower face of the body, a plurality of spring members fixedly secured to the axle with one end thereof terminating near the center of the body, a clip for securing the inner end of each spring member together, and radius rods secured to the frame and axle, respectively.

7. Means of the character described comprising two spring plate members with the outer end of each member secured to the lower face of the body, two springs secured to the axle, each of said springs having a top plate terminating near the center of the body, means for connecting the inner end of each top plate and inner end of each spring plate together, and a plurality of radius rods, each being secured at one end to a clip fixedly secured to the axle with its other end secured to the body by a ball and socket joint.

ARTHUR C. DESLER.